United States Patent [19]

Caruso

[11] 4,031,501
[45] June 21, 1977

[54] APPARATUS FOR ELECTRONICALLY LOCATING ANALOG SIGNALS

[75] Inventor: Frank Caruso, W. Long Branch, N.J.

[73] Assignee: The United States of America as represented by the Secretary of the Army, Washington, D.C.

[22] Filed: Apr. 5, 1976

[21] Appl. No.: 673,321

Related U.S. Application Data

[63] Continuation-in-part of Ser. No. 546,957, Feb. 4, 1975, abandoned.

[52] U.S. Cl. .......................... 340/6 R; 343/113 R; 340/16 R
[51] Int. Cl.² .......................................... G01S 3/80
[58] Field of Search .................. 340/6 R, 16 R; 343/113 R

[56] References Cited

UNITED STATES PATENTS

| | | | |
|---|---|---|---|
| 3,449,711 | 6/1969 | Ricketts, Jr. et al. | 340/6 R |
| 3,886,553 | 5/1975 | Bates | 340/6 R X |

Primary Examiner—Richard A. Farley
Attorney, Agent, or Firm—Nathan Edelberg; Michael Zelenka; Jeremiah G. Murray

[57] ABSTRACT

The described apparatus employs successive correlations of stored signal data in providing azimuth information to physically locate a given signal source. The correlations are performed automatically using digital processing techniques so as to enable the azimuth information to be obtained substantially in real time.

7 Claims, 3 Drawing Figures

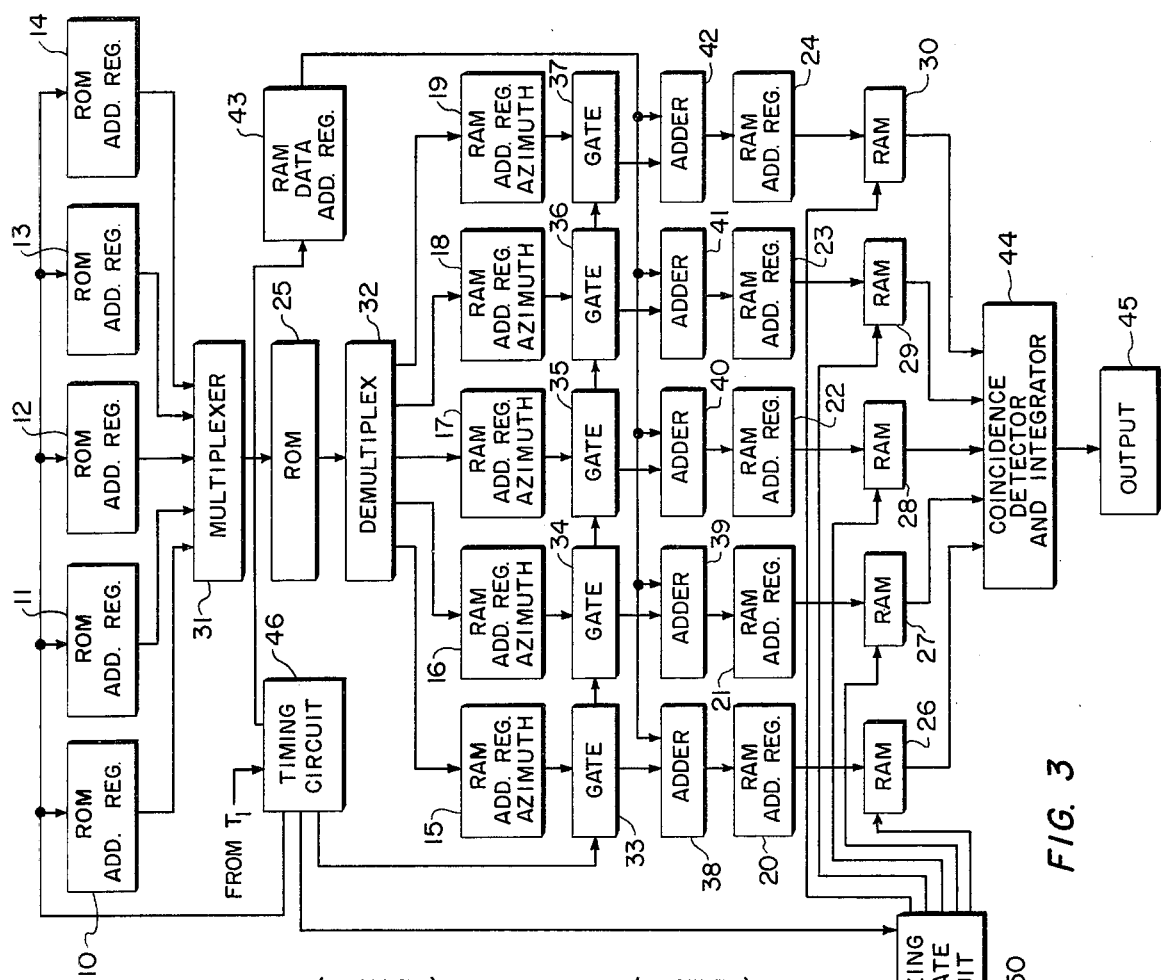
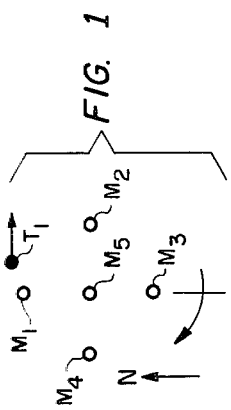
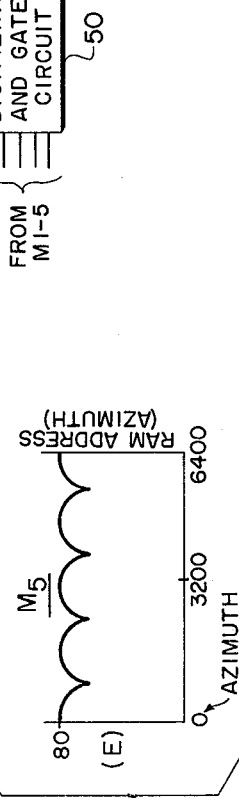
FIG. 1
FIG. 2
FIG. 3

APPARATUS FOR ELECTRONICALLY LOCATING ANALOG SIGNALS

This is a continuation in part of my copending application, Ser. No. 546,957 filed on Feb. 4, 1975, now abandoned, and is assigned to the same assignee as that application, the Government of the United States as represented by the Secretary of the Army.

FIELD OF THE INVENTION

This invention relates to apparatus for physically locating a source of analog signals and, more particularly, to such apparatus for determining the position of an acoustic or seismic source within a matter of seconds.

BACKGROUND OF THE INVENTION

As is well known, acoustic sensors and processors are used in many military applications to locate the position of artillery weaponry for subsequent, planned retaliation and destruction. Through a programmed pattern of transducer emplacements, the locations of weapon firings can also be determined. By analyzing the acoustic signals detected by these sensors, it also becomes possible to track the movement of vehicles and of personnel, and the operations of helicopters, as well. Other military applications -- such as monitoring the activities of submarines and/or underwater personnel -- and civilian applications -- such as detecting possible areas of volcanic and earthquake disturbances -- will readily come to mind.

However, as is also well know, a substantial amount of man-machine interaction is presently involved in determining that an information signal of this type is present, and in locating the physical position of the actuating source. Thus, in one known sound ranging apparatus, acoustic signals are first recorded on a paper tape, and then analyzed by an operator to distinguish noise from signal informations, and to distinguish a single signal return from a mix of returns, as in areas of many weapon firings. As used in military applications, the operator of this apparatus then determined the times of signal return, as measured from a reference, and then makes a series of computations to determine the azimuth to a suspected target. Factors such as wind velocity and temperature are compensated, for, and the resulting corrected raw data utilized in determining azimuth intersections on a map to locate a target position.

Not only will it be seen that this process permits a degree of human error, in advertently overlooking target returns that may be present and in finding suspected targets which, in reality, are not present, but it will be seen that this process, in actual operation, could take from 5-10 minutes to provide the results desired. While such delay may not be too important in civilian applications -- e.g., in locating the positions of expectant, future volcanic eruptions --, such delay is significantly more important in military applications where "hit-and-run" tactics are oftentimes employed.

SUMMARY OF THE INVENTION

The instant invention determines the azimuth of the source of a planar acoustic wavefront by measuring the relative time at which the wavefront encounters a multiplicity of sensors which are positioned in a known configuration and by comparing this set of measured relative encounter times with a series of known sets of times, each of which known set of times has been predetermined to represent a discrete azimuth. When a correlation is found between a set of known relative encounter times and the set of measured relative encounter times, the azimuth of the wavefront source has been determined.

The invention operates in a digital manner in real time and employs the use of a series of registers and memory circuits as will be explained in detail below. It provides for variations in detection of signals below the noise level and adjusts for temperature, by adjustment of system timing in a manner which corrects the raw data such that the sets of known relative encounter times remain relevant.

BRIEF DESCRIPTION OF THE DRAWING

These and other features of the present invention will be more clearly understood from a consideration of the following description, taken in connection with the accompanying drawing in which:

FIG. 1 is a pattern of a microphone transducer array which employed in determining the azimuth to a target source;

FIG. 2 is a series of curves, showing the delay characteristics of the microphones of FIG. 1, which are helpful in an understanding of the present invention; and FIG. 3 is a schematic block diagram of apparatus for electronically locating the signal source in accordance with the invention.

DETAILED DESCRIPTION OF THE DRAWING

The arrangement of FIG. 1 shows five acoustic transducers, illustrated as microphones M1-M5. Microphones M1 through M4 are positioned as as to form a square, microphone M5 being placed at the square's center. Automatic gain control as well as on and off switches may be provided for each transducer. Each of the microphones M1-M5 is connected by cabling, or other such means, to a central processing station.

At the central processing station, the output of the microphones is sampled at a rate consistent with well known principles so as to maintain the character of the information signal. Each microphone output is converted from an analog to a digital signal in a two level system, represented in the block diagram of FIG. 3 as digitizing and gate circuit 50, providing an output pulse whenever the absolute value of the analog signal exceeds a predetermined level. Each digitized signal is coupled into one of the random access memories (RAMS) 26–30. The choice of which random access memory 26–30 a specific digitized microphone signal is to be coupled to is not haphazard. The digitized signals from microphone M1–M5 are coupled to random access memories 26–30 respectively. A random access memory by its very nature is one which permits the insertion or withdrawal of information into any of its storage positions. The determination regarding into which storage position in the random access memory an incoming digitized microphone signal is entered will be discussed subsequently.

Random access memories 26–30 are accessed by the addresses in random access memory address registers 20–24. In order to understand the nature and significance of these addresses, it is necessary to understand the graphs of FIG. 2. These graphs represents computer plottings showing, along the Y axis, the time for an acoustic signal to travel from one of the microphones M1-M5 being used as a reference, the reference microphone always being the first transducer to receive the acoustic signal, to a second of the microphones M1–M5 being used in making an azimuth investigation. The X axis on each of the graphs of FIG. 2 provides two pieces of information: first the azimuth position of concern ranging from 0, corresponding to a source position due south of (or directly below) microphone 3 in FIG. 1, to 6400, corresponding to a clockwise rotation from the initial 0 position of 6400 mils; the second, the corresponding read only memory (ROM) address which will be some number between 0 and 1023 as will be further explained subsequently. The information contained in graphs A–E of FIG. 2 eventually provides the input information to random access memories 26–30 from random access address registers 20–24. Accordingly an understanding of these curves is essential to an understanding of the invention.

As was previously stated the curves of FIG. 2 begin for a signal source positioned due south of M3, a source at that position defined to have an azimuth of 0. Remembering that the Y axis represents the time delay from the time when the wavefront first encounters any transducer to the time when it encounters the transducer in question, we may begin to analyze curve A.

Curve A represents the response of microphone 1. As may be observed from FIG. 1, microphone 1 lies due north of microphone 3, the distance separating the two being the diagonal of the square formed by microphones M1–M4 and therefore representing the greatest separation of any two microphones. Since the signal comes from a position due south of microphone 3, its first encounter with the array of microphones will be microphone 3, and, accordingly, the time and signal encounters microphone 3 will be considered 0 time. The initial value of 160 on the X axis of curve A is a function of the time it takes the wavefront to travel from M3 to M1. This value is dependent upon the separation of the microphones, which is determined by assuming that azimuth investigations are to be made at 6.25 mil intervals, so that 1024 analysis can be made in a 360° angular rotational sweep. It can be shown that for a sampling rate of one analysis every 0.002 seconds the distance between opposite microphones should be 106 meters for a velocity of sound taken at 0° centigrade. Since the travel time for sound across this distance is 0.320 seconds at such temperature with the aforementioned sampling rate, the 106 meter spacing is the equivalent of 160 time intervals, or data time bits.

Now, if we assume the source begins to travel in a clockwise direction about the array of microphones, we will realize that the time period the wavefront takes to travel from microphone 3 to microphone 1 decreases, as is shown in curve A of FIG. 2. Note that when the source reaches an azimuth position just past a 45° rotation from due south of M3, M4 becomes the reference microphone, since it will be the first microphone in the array the wavefront will encounter. It is this switch in reference microphones which accounts for the slight break in the smoothness of curve A at the upper left. From this breakpoint the curve decreases smoothly to zero, which point corresponds to an azimuth position resulting from a clockwise rotation of just over 135° from the starting position due south of M3. The curve goes to zero at this point because it represents the time delay from the time the wavefront first encounters a microphone in the array, the reference microphone, until the time it reaches M1, the microphone curve A relates to. Since, after a source rotation of 135 degrees from the starting position, M1 will be the first microphone encountered by the wavefront, e.g. will become the reference microphone, there will be no delay time involved. Since M1 remains the reference microphone until the source rotates just over 225° from its initial position, curve A remains at 0 for this range of azimuth. Subsequently M2 becomes the reference microphone and still later M3, curve A being a mirror image about an azimuth representing a 180° (3200 mil) rotation from our starting point.

Curves for the other microphones M2–M5 are derived in a similar manner, the curve for M5 never going to zero since, being centrally located, microphone 5 could never be the reference microphone. Therefore, from the curves of FIG. 2, it will be seen that if microphones M2, M4 and M5 simultaneously receive an acoustic signal 80 data time bits (or 0.160 seconds) after a signal is received by microphone M1 and some 80 data time bits or 0.160 seconds still later, a signal is detected by the microphone M3, then that indicates the presence of a signal due north of microphone M1, at azimuth 3200. If these conditions are not satisfied, it will be understood that the signal source is located along another azimuth. Similarly, if microphones M1, M3 and M5 detect an acoustic wave some 80 data time bits or 0.160 seconds after detection by microphone M2, and if microphone M4 detects a sound signal some 80 data time bits or 0.160 seconds still later, then that concurrence corresponds to the presence of an acoustic signal due East of microphone M2, at azimuth 4800. On the other hand, if microphone M3 is the first to detect an acoustic signal, and if microphone M5 picks up a signal some 75 data time bits or 0.150 seconds later, and if microphone M2 receives the sound wave some 60 data time bits or 0.120 seconds after detection by microphone M3, and if microphone M4 detects that signal at 110 data time bits or 0.220 seconds after microphone M3 detection and if microphone M1 receives the indication some 150 data time bits or 0.30 seconds after the initial M3 receipt, then it will be seen that the azimuth would be at location 6000 mils, the signal source then being physically located South-Southeast of microphone M3.

At this point a brief overview may be useful before specifically relating the manner in which the remainder of the invention operates. In FIG. 3, there are shown five "read only memory" address registers 10–14, and five "random access memory" address registers 20–24. In addition, one read only memory 25 is employed, as are five random access memories 26–30. As shown, outputs from the address registers 10–14 are coupled via a multiplexer 31 to the read only memory 25, the output of which is divided by a demultiplexer 32 to be applied as inputs to the address registers for azimuth 15–19. Their output terminals are, in turn, coupled via gate circuits 33–37 to the inputs of adders 38–42, where the signals are individually summed with an input signal provided from a random access memory data address register 43. The outputs from the adders 38–42 drive the address registers 20–24 which dictate the addresses in the random access memories 26–30, into and out of which data will be read. The output of each random access memory 26–30 is coupled by means of a coincidence detector 44 to an output display device 45 arranged to plot signal amplitude as a function of azimuth position. As was previously mentioned, that azimuth which corresponds to the maximum output amplitude, if any, represents the location along which the signal source detected is positioned.

In order to better understand the operation of the apparatus of FIG. 3, it is important to recognize that the read only memory address registers, 10–14, are each associated with microphones M1–M5 respectively. Similarly, random access memory azimuth address registers, 15–19, are also each associated with microphones M1–M5 respectively.

Since the invention operates on the principle of comparing the sensor readings from an unknown location with those which would be expected were the source located at some predetermined position, it is first necessary to choose a starting point for the comparisons. A position due south of microphone 3 in the array of FIG. 1 has been arbitrarily selected. As previously discussed, this position corresponds to an azimuth reading of zero.

The X axis on each of the graphs of FIG. 2 provides two pieces of information: the azimuth position of concern, ranging from 0 (corresponding to a source position due south of microphone 3 in FIG. 1) to 6400 (corresponding to a clockwise rotation from the initial 0 position of 6400 mils) and the corresponding ROM azimuth address, which will be some number between 0 and 1023, as will be further explained subsequently.

The Y axis provides the RAM azimuth address corresponding to the information provided on the X axis. As was previously explained, this figure represents the number of data time bits from the time the wavefront first encounters the reference microphone until the time it encounters the microphone of interest and ranges in value from 0 to 160.

Graphs A–E of FIG. 2 therefore give the relationship of the ROM azimuth address to the RAM azimuth address for each of the microphones 1–5 and therefore for each of the pairs of registers 10, 15; 11, 16; 12, 17; 13, 18; and 14, 19 respectively. Accordingly, ROM address registers 10–14 are initially set to counts 0,768,512,256 and 0 respectively. At the same time the address registers for azimuth 15–19 are initially set to 160, 80, 0, 80 and 80 respectively. Remembering the relationship of each of the registers with a microphone, the correlation of the above addresses may be readily checked from an examination of the curves of FIG. 2. The value in ROM address register 10, for example, is related to the value in RAM address register 15 by the relation shown in graph A, for microphone 1 of FIG. 2. As explained earlier, the graphs of FIG. 2 all begin for a signal source due south of microphone 3. It will be seen from the figure therefore that an azimuth ROM address of 0, that number in address register 10, corresponds to a RAM azimuth register address of 160, that number in address register 15. Similarly, in the case of microphone 2 an azimuth ROM address of 768 corresponds to an azimuth position of zero and an RAM azimuth address of 80 and so on.

The significance of the fact that the ROM azimuth addresses range from 0 to 1023 will better be understood when it is recognized that 1024 independent azimuth exist in a 360° angular rotation of 6.25 mils separation. Examining again the curve of FIG. 2, and neglecting for the present the curve associated with microphone 5, it will be seen that all the curves pictured are really the same curve, shifted over 6400 mils of sweep. This may be easier to envision if one looks at the curve for microphone 3 and imagines a series of such curves repeated along the X axis at a constant interval. It will be seen that the curves for every other microphone are those which would be seen through a sliding window 6400 mils wide moving along the X axis. While microphone 3 was utilized to show the identity of curves A through D, in actuality, microphone 1 forms the basis for the numbering of the ROM azimuth addresses. Looking now at the curve for microphone 1 in FIG. 2 it will be seen that the ROM azimuth address varies from 0 to 1023 over a sweep range of 0–6400, thereby providing 6.25 mils of sweep for each address position. ROM 25 has 1024 storage positions corresponding to the 1024 possible address of each ROM address register 10, 11, 12 and 13. In order to aid in understanding the invention, each storage position in ROM 25 may be thought of as being occupied by a corresponding RAM azimuth address of which there are 160, the significance of which has previously been discussed. Since each of the curves pictured in graphs A–D are really the same curve beginning at a different starting point, it will be realized that once each address in ROM 25 contains a RAM azimuth address each of the curves A through D may be reconstructed simply by choosing the appropriate starting address in ROM 25, counting up to 1023, resetting to 0 and continuing the count back to the starting address. By plotting ROM 25 addresses on the X axis and the contents of those addresses, that is, the RAM address on the Y axis, each of the curves A through D of FIG. 2 may be duplicated. For example, in order to duplicate curve B of FIG. 3, one simply starts the curve at address 768 of ROM 25, corresponding to a RAM address of 80, and counts up to 1023, plotting the RAM address in the Y direction as one continues, resets to 0 and continues counting up to 767. Similarly, for curve C one starts at ROM 25 address 512 and for curve D at ROM 25 address 256.

Before discussing the system operation two additional points should be addressed. First, the foregoing discussion assumed for clarity purposes that each ROM 25 address contained a RAM azimuth address, in actuality that is not the case. Instead, each position in ROM 25 contains an increment (which may be positive, negative, or zero) which, when added to the previous RAm azimuth address, provides the new RAM azimuth address related to the ROM address in question. RAM azimuth address registers 15–19 therefore serve as up-down counters. An illustration of this process follows.

Suppose for the sake of example ROM address register 10 contained an address of 300 during a given cycle which corresponds to a RAM azimuth address register value of 100. Suppose further that the ROM address a register 10 was advanced (by a means thus far undisclosed) to 301. At address 301 ROM 25 has stored in it some increment, which when algebraically added to the RAM azimuth address for 300, will yield the RAM azimuth address for 301. This increment is algebraically added to the value in RAM azimuth address register 15, 100 in the example given. So doing provides that register with the RAM azimuth address dictated by graph A of FIG. 2 for an ROM address of 301. A similar procedure is utilized for each of the other address register pairs 11, 16; 12, 17; and 13, 18.

The second point which should be discussed at this time is the operation of the invention with respect to microphone 5. Since microphone 5 is centrally located its response curve representing a plot of RAM azimuth address versus azimuth, shown in graph D of FIG. 2, is unlike the curve which characterizes the response of the other microphones. Accordingly, ROM 25 contains a separate series of increments for the special case of microphone 5. The remainder of the operation of the invention is the same with respect to microphone 5 as it is with respect to the other microphones.

Having discussed the initial conditions of the ROM address registers 10–14 and the RAM azimuth address registers 15–19, the description of the system's operation will be continued. Neglecting for the present the function of RAM data address register 43, the contents of the RAM azimuth address registers 15–19 are coupled to adders 38–42 respectively through gates 33–37 respectively. The opening and closing of gates 33–37 is controlled by timing circuit 46. As will become clear later, the gates 33 through 37 are open at the outset and the initial value from RAM data address register 43 is 0. The contents of RAM azimuth address registers 15–19 are then coupled through the gates 33–37 through the adders 38–42 and into RAM address registers 20–24. The addresses in RAM address registers 20–24 govern the selection of addresses in RAM 26–30 the contents of which will be outputted to coincidence detector 44.

The significance of this operation will be better understood when it is realized that each RAM 26–30 contains 256 storage positions which store the inputs from microphones 1–5 in real time, that is, the relative time of receipt of each of the signals from the microphones is preserved and referenced to a common zero position. Accordingly, inspection of the data stored in preselected address in RAM 26–30 will determine the existence or lack of existence of a source at an azimuth characteristic of the addresses selected.

Having so related the basic theory and operation of the invention, specifics not thus far disclosed will now be explained. Among the areas requiring further explanation are included the timing circuits; the nature of RAMs 26–30; the function of RAM Data Address Register 43; and the nature of the coincidence and integration circuit.

RAMs 26-30 are 256 storage position (bit) devices. Two hundred and fifty-six positions are required to provide one position for each of the one hundred and sixty RAM azimuth addresses, an additional ninety positions to provide for signal duration, the signal assumed to be in the order of ninety bits long and an additional six bits to provide convenience in utilizing the wrap around feature of a 256 bit memory. It will therefore be recognized that the output of RAMs 26–30 is not the data stored in a particular single address location but rather that stored in that particular location plus those stored in the subsequent 90 positions.

The timing circuits and the function of RAM Data Address Register 43 are related and will be discussed together. Microphone input samples are only permitted to enter RAMs 26–30 every 2 milliseconds. In between data entries 16 azimuth positions out of a potential 1024 azimuth positions are inspected. New data inputted into RAMs 26–30 replaces the oldest data in those memories. This is accomplished through the use of the following sequencing technique. For the purposes of illustration we will again start at an azimuth position of zero, e.g. at a point due south of microphone 3. The initial conditions previously explained are read into ROM address registers 10 through 14 and RAM azimuth address registers 15 through 19. Gates 33 through 36 are open at this time and the output of RAM data address register 43 is 0. Accordingly, adders 38–42 have no effect on the addresses in address registers 15 through 19 and those addresses are supplied to RAM address registers 20 through 24 and used to call out data from RAMS 26 through 30, which data is then examined for coincidence as will be explained later. ROM address registers 10 through 14 are then each incremented by one address position by means of a control pulse from the timing circuits and a new azimuth one increment of scan away from the zero position is investigated. These new addresses are fed through multiplexer 31 into ROM 25 and the output thereof is demultiplexed in demultiplexer 32 and used to increment the RAM azimuth address registers 15–19 in the manner previously disclosed. At this time timing circuit 46 still maintains gates 33–37 in the open position and the RAM data address register 43 output is still zero so that adders 38–42 again have no effect, the addresses in RAM azimuth registers 15–19 again appear unaltered in RAM address registers 20–24 and are used to call out data from RAMS 26–30 which data is subsequently checked for coincidence etc. This process is continued for a total of 16 azimuth positions, that is from an azimuth position of 0 through an azimuth position 15 increments away from 0, each time updating registers 10–14 and holding RAM data address register 43 at 0. Subsequent to the completion of the analysis of the fifteenth increment of azimuth scan a time period of 2 milliseconds has elapsed and new data must be read in. At that time timing circuit 46 closes gates 33 through 37. The output of RAM data address register 43 remains at zero and the address is coupled to adders 38–42. Since gates 33–37 are closed at that time, the addresses in RAM azimuth address registers 15–19 have no effect and the output of RAM data address register 43 is coupled to RAM address registers 20–24. This address, a zero in this instance, governs the positions in RAMs 26–30 into which the new bit data is entered, that is, the new bit of data is entered into RAMs 26–30 in position 0. After the entry of the new information RAM data address register 43 is incremented by 1 by means of a control pulse from the timing circuits 46 which also reopen gates 33 through 36, and azimuth analysis continues. At this time the numbers in ROM address registers 10–13 have been updated to reflect the seventeenth increment of azimuth scan. RAM azimuth address registers 15–19 are incremented in the proper manner. Gates 33–37 are open and the values in the RAM azimuth address registers are coupled to adders 38–42. At this time, however, the output of RAM data address register 43 is 1 and therefore the output of adders 38–42 is the addresses in RAM azimuth address registers 15–19 incremented by 1. These values are entered into RAM address registers 20–24 respectively, thereby effectively shifting the zero position of these address registers by 1 to account for the one increment shift of the initial position in RAMs 26–30 resulting from the entering of the first bits of the new data therein. This incrementation of the addresses in RAM azimuth address registers 15–19 by 1 continues through the subsequent 15 cycles. At that time another two milliseconds has elapsed, and the second series of new data bits must be entered into RAMs 26–29. Timing circuit 46 closes gates 33–37. The sole input to adders 38–42 is therefore the output of the RAM data address register 43, in this case a 1. This 1 is inputted into RAM address registers 20 through 24 and accordingly coupled to RAMs 26–30 thereby directing that the input data replace the data in the storage position designated 1 of those RAMs. RAM data address register 43 is then incremented to a value of 2 and the process as described above continues. It will be realized, therefore, that RAM data address register 43 may contain as many addresses as are possible in RAMS 26-30 to insure proper transposal of the 0 point. It is understood that the situation will arise where the sum of the numbers in a RAM azimuth address register 15-19 plus the number from RAM data address register 43 exceeds the number of addresses in the RAM 26-30. In that instance the RAM address registers 20-24 will count up to the maximum number of storage positions available and then reset starting at their initial position and continue counting until the total count reaches the above counting off the number of positions until the total count reaches the above mentioned sum, thereby providing the wrap around features previously noted. Determination as to the existence of a source at a given azimuth is accomplished by means of the coincidence detection and integration circuits. If the threshold level of the digitizing circuitry was set sufficiently high, i.e. just above the highest noise level, it would only be necessary to check the contents of one set of addresses in RAMs 26-30 in order to determine the existence of a source at a corresponding azimuth position. Real signals at or below the noise level would not be detected in this circumstance. If, on the other hand, the digitizing circuit threshold level is set below the noise level, the probability of false source positions is greatly increased if only one address position is sampled. The invention overcomes this difficulty by sampling a number of address positions in each RAM for each azimuth under investigation. As was explained earlier each signal inputted into RAMs 26-30 occupies ninety address positions and that when data is called out of any given address the data in the subsequent 89 addresses is also outputted. If the digitizing circuit threshold level is set below the level of the highest noise signals, some addresses in the ninety addresses sampled from each RAM 26-30 will contain digital indication that a signal existed, a 1, when in actuality that indication is a result of noise. Since noise is random, however, it is improbable that a noise signal will occur in the same relative position in each group of ninety sampled positions for each of the five microphones. A real signal, however, since it is not random, would appear in the same relative position in each group of ninety sampled positions for each of the five microphones. The invention makes use of this situation in detecting signals below the noise level by comparing the signals associated with all of the five microphones for each of the ninety memory positions examined for any particular azimuth. This operation is accomplished in the coincidence detector portion of the coincidence detection and integration circuits 44. Whenever a signal appears in the same relative position in each of the five groups of ninety memory positions a plus 1 count is sent to an integrating circuit. The effects of noise are thereby discounted. When the coincidence detector has examined each of the ninety positions associated with a given azimuth the count in the integrator circuits is coupled to the output circuits for read out or display purposes. This read out or display is correlated with the azimuth position then under investigation, those azimuth positions having a sufficiently high predetermined count being indicative or source locations.

Temperature compensation is accomplished by measuring this parameter in the vicinity of the sensor array and adjusting the sampling rate based on the expected change in propagation time of the wave across the array. This temperature compensation is represented schematically in FIGS. 1 and 3, wherein FIG. 1 indicates a temperature sensor $T_1$ in the vicinity of the microphone array and FIG. 3, at Timing Circuit 46, indicates an input from sensor $T_1$ which operates to regulate the sampling rate. Since the dimensions of the array are fixed and since the propogation of the wave varies in accordance with well-known physical laws, the required adjustment in sampling rate is readily determinable. For the specific embodiment described the sampling rate varies from 472.8 Hz at −30 to 563.3 Hz at 70° C with a value of 500 Hz at 0° C.

Output circuitry may include a printer or a scope display.

What is claimed is:

1. Apparatus for electronically locating the source of an acoustic or seismic planar wave comprising:
    a plurality of signal transducers physically positioned in a predetermined array for detecting an analog acoustic or seismic planar wave and producing an analog electrical signal indicative of said wave;
    transducer sampling means electrically coupled to each signal transducer for sampling the detected analog signal at a first sampling rate consistent with the dimensions of the array and the frequency characteristic of the analog signal;
    digitizing means, electrically coupled to the output of the transducer sampling means for digitizing each analog electrical signal;
    a first plurality of memory means electrically coupled to said digitizing means for storing the digitized signals associated with each transducer in real time;
    programmed sampling means electrically coupled to the first plurality of memory means for repeatedly, selectively sampling the partial contents of each of the first plurality of memory means at a second sampling rate in predetermined patterns, each sample pattern corresponding to the expected positions of the digitized signals in the plurality of memory means for a known azimuth position of the source of said planar wave; detection and summation means electrically coupled to the output of the first plurality of memory means for detecting the sampled contents of each of the first plurality of memory means and selectively summing the sampled contents so as to discount the effects of random noise;
    output means coupled to the output of the detection and summation means for displaying the summations.

2. The apparatus of claim 1 wherein said first plurality of memory means comprise a plurality of random access memories.

3. The apparatus of claim 2 wherein said programed sampling means is comprised of a programmed read only memory, access to which is governed by a series of variable address registers, and the contents of which relates the difference in signal acquisition time of said plurality of signal transducers to the azimuth position of the signal source, the output of said programmed memory supplying the patterns utilized in sampling the plurality of random access memories.

4. The apparatus of claim 3 wherein said programmed sampling means includes a timing means to synchronize system timing.

5. The apparatus of claim 4 wherein updating and indexing means are provided to update the random access memories with new data in a first-in-first-out manner and index the information stored in said random access memories so that a correlation is maintained between the raw data and the information stored in the programmed read only memory.

6. The apparatus of claim 5 further comprising temperature compensation means which varies the transducer sampling rate in a manner such as to adjust for temperature induced changes in the propagation speed of the wave across the array.

7. The apparatus of claim 6 wherein said detection means comprises a coincidence detector electrically coupled to an integrating circuit and wherein the coincidence detector will only provide an input to the integrating circuit when coincidence is found among selected portions of the sampled patterns from said first plurality of memory means.

* * * * *